(12) United States Patent
Polanco (10) Patent No.: US 9,958,011 B2
(45) Date of Patent: May 1, 2018

(54) BEARING ASSEMBLY HAVING SURFACE PROTRUSIONS AND A SEAL (71) Applicant: Roller Bearing Company of America, Inc., Oxford, CT (US)

(72) Inventor: Moises Polanco, Delémont (CH)

(73) Assignee: ROLLER BEARING COMPANY OF AMERICA, INC., Oxford, CT (US)

( * ) Notice: Subject to any disclaimer, the term of this patent is extended or adjusted under 35 U.S.C. 154(b) by 317 days.

(21) Appl. No.: 14/743,353

(22) Filed: Jun. 18, 2015

(65) Prior Publication Data
US 2015/0362019 A1 Dec. 17, 2015

Related U.S. Application Data (63) Continuation-in-part of application No. 13/936,574, filed on Jul. 8, 2013, now Pat. No. 9,316,257, which is a continuation-in-part of application No. 13/078,486, filed on Apr. 1, 2011, now abandoned.

(60) Provisional application No. 62/014,032, filed on Jun. 18, 2014.

(51) Int. Cl.
*F16C 33/74* (2006.01)
*F16C 23/04* (2006.01)
*F16C 11/06* (2006.01)

(52) U.S. Cl.
CPC .......... *F16C 33/74* (2013.01); *F16C 11/0614* (2013.01); *F16C 11/0676* (2013.01); *F16C 23/045* (2013.01); *F16C 2300/02* (2013.01)

(58) Field of Classification Search
CPC ..... Y10T 403/32541; Y10T 403/32729; F16C 11/0614; F16C 11/0666; F16C 11/0671
See application file for complete search history.

(56) References Cited

U.S. PATENT DOCUMENTS

| 2,630,356 A | 3/1953 | Johnson |
| 3,052,477 A * | 9/1962 | Parker ................ F16C 11/0671 277/635 |
| 3,547,474 A | 12/1970 | Colletti et al. |
| (Continued) | | |

FOREIGN PATENT DOCUMENTS

| CN | 2789498 Y | 6/2006 |
| CN | 200942698 Y | 9/2007 |
| (Continued) | | |

OTHER PUBLICATIONS

Extended European Search Report for European Patent Application No. 151726833-1760, dated Dec. 21, 2015.
(Continued)

*Primary Examiner* — Michael P Ferguson
(74) *Attorney, Agent, or Firm* — Murtha Cullina LLP (57) ABSTRACT

A bearing assembly has an outer race, which has an arcuate inner surface and an inner member that is partially disposed in the outer member and which has an arcuate outer surface. The inner member has one or more hubs that extend axially from the inner member. The one or more hubs each have one or more circumferentially extending surface depression that is positioned proximate the arcuate outer surface. The one or more hubs each have one or more circumferentially extending surface protrusion that is positioned axially outward beyond the at least one circumferentially extending surface depression.

12 Claims, 9 Drawing Sheets

(56) References Cited

U.S. PATENT DOCUMENTS

| | | |
|---|---|---|
| 3,591,192 A | 7/1971 | Sharp et al. |
| 3,700,297 A | 10/1972 | Fickenwirth et al. |
| 3,814,446 A | 6/1974 | Derman |
| 3,822,100 A | 7/1974 | Reinsma et al. |
| 3,848,938 A | 11/1974 | Stella et al. |
| 3,897,121 A | 7/1975 | Riegler et al. |
| 3,900,408 A | 8/1975 | Turner |
| 4,034,996 A | 7/1977 | Manita et al. |
| 4,052,804 A | 10/1977 | Stedman |
| 4,080,013 A | 3/1978 | Koch |
| 4,089,095 A | 5/1978 | Becker |
| 4,109,976 A | 8/1978 | Koch |
| 4,130,324 A | 12/1978 | Becker |
| 4,210,405 A | 7/1980 | Jesswein |
| 4,239,243 A | 12/1980 | Bainard et al. |
| 4,311,316 A | 1/1982 | Cather, Jr. |
| RE31,298 E | 7/1983 | Herbenar |
| 4,447,094 A | 5/1984 | Trudeau et al. |
| 4,674,164 A | 6/1987 | McCloskey |
| 4,810,233 A | 3/1989 | Crane, Jr. et al. |
| 4,869,602 A | 9/1989 | Berg |
| 5,004,248 A | 4/1991 | Messenger et al. |
| 5,033,872 A | 7/1991 | Ueno et al. |
| 5,133,609 A | 7/1992 | Ishiguro |
| 5,222,816 A | 6/1993 | Kondoh et al. |
| 5,242,228 A | 9/1993 | Hattori |
| 5,288,354 A | 2/1994 | Harris et al. |
| 5,419,642 A | 5/1995 | McLarty |
| 5,441,351 A | 8/1995 | Grunze |
| 5,480,231 A | 1/1996 | Sasaki et al. |
| 5,573,336 A | 11/1996 | Maroney |
| 5,577,741 A | 11/1996 | Sink |
| 5,655,845 A | 8/1997 | Lampart |
| 5,993,065 A | 11/1999 | Ladzinski et al. |
| 6,082,905 A | 7/2000 | Vignotto et al. |
| 6,190,080 B1 | 2/2001 | Lee |
| 6,217,031 B1 | 4/2001 | Catalano et al. |
| 6,273,406 B1 | 8/2001 | Miyamoto et al. |
| 6,325,544 B1 | 12/2001 | Sasaki et al. |
| 6,349,470 B1 | 2/2002 | Sasaki et al. |
| 6,626,575 B2 | 9/2003 | Hartl |
| 6,652,179 B2 | 11/2003 | De Freitas |
| 6,685,377 B2 * | 2/2004 | Nakata ............... F16C 11/0614 403/122 |
| 6,955,473 B2 | 10/2005 | Reddehase et al. |
| 7,017,890 B2 | 3/2006 | Rechtien |
| 7,244,074 B2 | 7/2007 | Abels et al. |
| 7,464,968 B2 | 12/2008 | Sakazaki et al. |
| 7,547,146 B2 | 6/2009 | Kinno et al. |
| 7,568,840 B2 | 8/2009 | Smith et al. |
| 7,654,766 B2 | 2/2010 | Zuge et al. |
| 7,658,546 B2 | 2/2010 | Clarke et al. |
| 8,038,351 B2 | 10/2011 | Arnold et al. |
| 8,783,953 B2 | 7/2014 | Voisine et al. |
| 8,801,318 B2 | 8/2014 | Knoble et al. |
| 8,905,879 B2 | 12/2014 | Lannutti et al. |
| 2003/0095729 A1 | 5/2003 | Post et al. |
| 2003/0187512 A1 | 10/2003 | Frederick et al. |
| 2006/0098908 A1 | 5/2006 | Clarke et al. |
| 2006/0171775 A1 | 8/2006 | McLaughlin et al. |
| 2007/0019895 A1 | 1/2007 | Smith et al. |
| 2007/0065057 A1 | 3/2007 | Smith et al. |
| 2008/0040886 A1 | 2/2008 | Arnold et al. |
| 2011/0033227 A1 * | 2/2011 | Kwon ............... F16C 11/0614 403/135 |
| 2011/0091143 A1 | 4/2011 | Murphy et al. |
| 2012/0248723 A1 | 10/2012 | Harper et al. |
| 2014/0016888 A1 | 1/2014 | Harper et al. |

FOREIGN PATENT DOCUMENTS

| | | | |
|---|---|---|---|
| CN | 101240811 A | 8/2008 | |
| CN | 201277260 Y | 7/2009 | |
| CN | 201487175 U | 5/2010 | |
| CN | 201494270 U | 6/2010 | |
| CN | 201771976 U | 3/2011 | |
| CN | 202883719 U | 4/2013 | |
| CN | 203362845 U | 12/2013 | |
| DE | 7011118 U | 7/1970 | |
| DE | 2755502 A1 | 6/1979 | |
| DE | 8309873 U1 | 9/1983 | |
| DE | 3725404 A1 | 3/1989 | |
| DE | 3725404 C2 | 8/1989 | |
| DE | 19834678 A1 | 2/2000 | |
| DE | 100 18 763 | * 10/2001 | ............ F16C 23/04 |
| DE | 19834677 C2 | 10/2002 | |
| DE | 19834678 C2 | 10/2003 | |
| DE | 10256334 A1 | 6/2004 | |
| DE | 102007039858 A1 | 3/2008 | |
| DE | 10 2007 012 891 | * 4/2008 | ............ F16C 11/06 |
| DE | 102008029449 A1 | 12/2009 | |
| DE | 102008037990 A1 | 2/2010 | |
| EP | 553565 A2 | 8/1993 | |
| EP | 0903509 A1 | 3/1999 | |
| EP | 1114938 A1 | 7/2001 | |
| EP | 2505858 A2 | 10/2012 | |
| EP | 2505858 A3 | 10/2013 | |
| FR | 1488848 | 6/1967 | |
| FR | 2056118 | 5/1971 | |
| FR | 2171567 | 9/1973 | |
| GB | 486220 | 6/1938 | |
| GB | 915758 | 1/1963 | |
| GB | 2400149 A | 10/2004 | |
| JP | 402195013 A | 8/1990 | |
| JP | 40425609 A1 | 1/1992 | |
| JP | 06123315 A | 5/1994 | |
| JP | 07190066 A | 7/1995 | |
| JP | 201193735 A | 7/2001 | |
| JP | 2002054644 A | 2/2002 | |
| JP | 2002139033 A | 5/2002 | |
| JP | 2007100799 A | 4/2007 | |
| JP | 4298713 B2 | 7/2009 | |
| JP | 2014523509 A | 9/2014 | |
| KR | 1020110015813 A | 2/2011 | |
| WO | 2008074063 A1 | 6/2008 | |
| WO | WO 2012/059314 | * 5/2012 | ............ F16C 11/06 |
| WO | 2013000517 A1 | 1/2013 | |
| WO | 2013013005 A1 | 1/2013 | |
| WO | 2013117238 A1 | 8/2013 | |

OTHER PUBLICATIONS

International Search Report for PCT/US2012/047331, dated Oct. 18, 2012.

International Preliminary Report on Patentability for PCT/US2012/047331, dated Jul. 8, 2013.

Extended European Search Report for EP12162427.4-1758/2505858, dated Aug. 30, 2013.

Extended European Search Report for EP14175715.3-1751/2829749, dated Jun. 18, 2015.

* cited by examiner

BEARING ASSEMBLY HAVING SURFACE PROTRUSIONS AND A SEAL

CROSS REFERENCE TO RELATED APPLICATIONS

This patent application claims priority benefit under 35 U.S.C. § 120 to U.S. Provisional Patent Application No. 62/014,032, filed Jun. 18, 2014. This patent application is a continuation in part of and claims priority benefit under 35 U.S.C. § 120 to co-pending U.S. patent application Ser. No. 13/936,574 filed on Jul. 8, 2013, which is a continuation in part of and claims priority to U.S. patent application Ser. No. 13/078,486 filed Apr. 1, 2011, all of which are hereby incorporated by reference in their entirety.

FIELD OF THE INVENTION

The present invention relates generally to a bearing assembly, and more specifically to a bearing assembly having hubs which include circumferentially extending surface protrusions that each cooperate with a seal to inhibit the ingress of contaminants into the bearing.

BACKGROUND OF THE INVENTION

A typical bearing includes an inner member disposed partially in an outer member. The inner member moves relative to the outer member. A common problem in the bearing industry is the entry of contaminants into a space between the inner member and the outer member of the bearing. These contaminants, such as dust, metallic particles and dirt, inhibit the ability of the bearing to function properly (i.e., inhibit reduction of friction).

One solution to this problem is the installation of a seal on the bearing. However, some seals do not keep all contaminants out of the bearing and can impair motion of the inner member relative to the outer member. In addition, movement of the inner member relative to the outer member can cause the seal to become dislodged. A means of preventing contaminant entry that would not impair relative motion of the inner member and the outer member and would better keep contaminants out of the bearing has long been sought in the industry.

SUMMARY

In one aspect, the present invention resides in a bearing assembly having an outer race, which has an arcuate inner surface, and an inner member, which has an arcuate outer surface. The inner member is disposed partially in the outer member. The inner member has a hub extending from opposing axial ends of the inner member. Each hub includes one or more circumferentially extending surface depressions, which are positioned proximate the arcuate outer surface. Each hub includes one or more circumferentially extending surface protrusions, which are positioned axially outwards beyond the circumferentially extending surface depressions. A seal is secured to the outer race. The seal extends in a predetermined position axially outward from the circumferentially extending surface protrusion. The seal is in sliding engagement with the circumferentially extending surface protrusion. The seal maintains the predetermined position during misalignment of the inner member relative to the outer member.

In one aspect, the present invention resides in a bearing assembly having an outer race, which has an arcuate inner surface, and an inner member, which has an arcuate outer surface. The inner member is disposed partially in the outer member. The inner member has a hub extending from opposing axial ends of the inner member. Each hub includes one or more circumferentially extending surface depressions, which are positioned proximate the arcuate outer surface. Each hub includes one or more circumferentially extending surface protrusions, which are positioned axially outwards beyond the circumferentially extending surface depressions. A seal is secured to the outer race. The seal extends in a predetermined position axially outward from the at least one circumferentially extending surface protrusion. The seal is spaced apart from the at least one circumferentially extending surface protrusion. The seal maintains the predetermined position during misalignment of the inner member relative to the outer member. In one embodiment, the circumferentially extending surface protrusions include corrosion resistant material.

DETAILED DESCRIPTION OF THE PREFERRED EMBODIMENT

Figure 1:
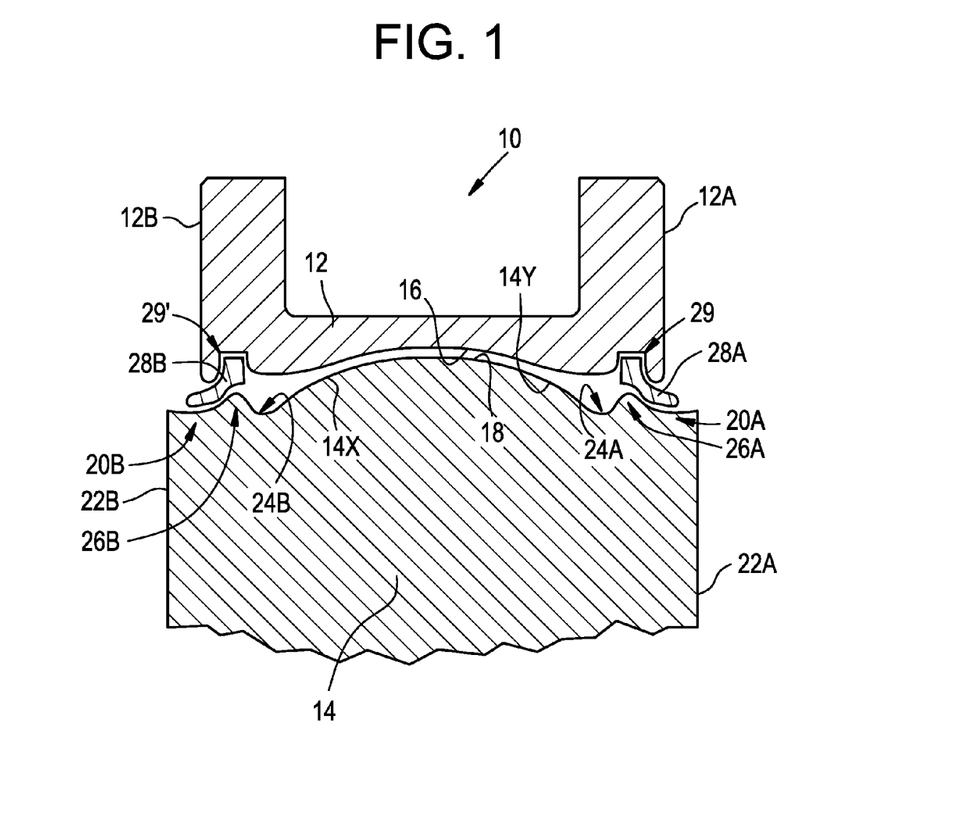
FIG. 1 is a front cross sectional view of a portion bearing assembly of the present invention.

As shown in FIG. 1, a bearing assembly is generally designated by the numeral 10. The bearing assembly 10 includes an outer race 12 and an inner member 14. The inner member 14 is disposed partially in the outer race 12. The outer race 12 has an arcuate inner surface 16. The outer race 12 extends between a first axial end 12A and a second axial end 12B. The inner member 14 has an arcuate outer surface 18. The inner member 14 includes a hub 20A (discussed further herein) which extends axially outward from an axial side 14Y of the inner member 14 and terminates at an axial end 22A of the inner member 14. The inner member 14 includes a hub 20B (discussed further herein) which extends axially outward from an axial side 14X of the arcuate outer surface 18 of the inner member 14 and terminates at an axial end 22B of the inner member 14.

As shown in FIG. 1, the inner member 14 includes two circumferentially extending surface depressions 24A and 24B. Each of the circumferentially extending surface depressions 24A and 24B is positioned on the respective hub 20A, 20B proximate the respective axial side 14X, 14Y of the arcuate outer surface 18. In one embodiment, the circumferentially extending surface depressions 24A and 24B have an arcuate base portion. Although two circumferentially extending surface depressions 24A and 24B are shown in FIG. 1, the present invention is not limited in this regard, as any suitable number of circumferentially extending surface depressions may be included, such as, but not limited to, two circumferentially extending surface depression on each axial side of the arcuate outer surface 18 of the inner member 14.

As shown in FIG. 1, the inner member 14 includes two circumferentially extending surface protrusions 26A and 26B. The circumferentially extending surface protrusion 26A is positioned on the hub 20A axially outward from the circumferentially extending surface depression 24A. In one embodiment, the circumferentially extending surface protrusion 26A has an arcuate body portion. The circumferentially extending surface protrusion 26B is positioned on the hub 20B axially outward from the circumferentially extending surface depression 24B. In one embodiment, the circumferentially extending surface protrusion 26B has an arcuate body portion. Although two circumferentially extending surface protrusions 26A and 26B are shown in FIG. 1, the present invention is not limited in this regard, as any suitable number of circumferentially extending surface protrusions may be included, such as, but not limited to, four circumferentially extending surface protrusions on each axial side 14X and 14Y of the arcuate outer surface 18 of the inner member 14.

Figure 2:
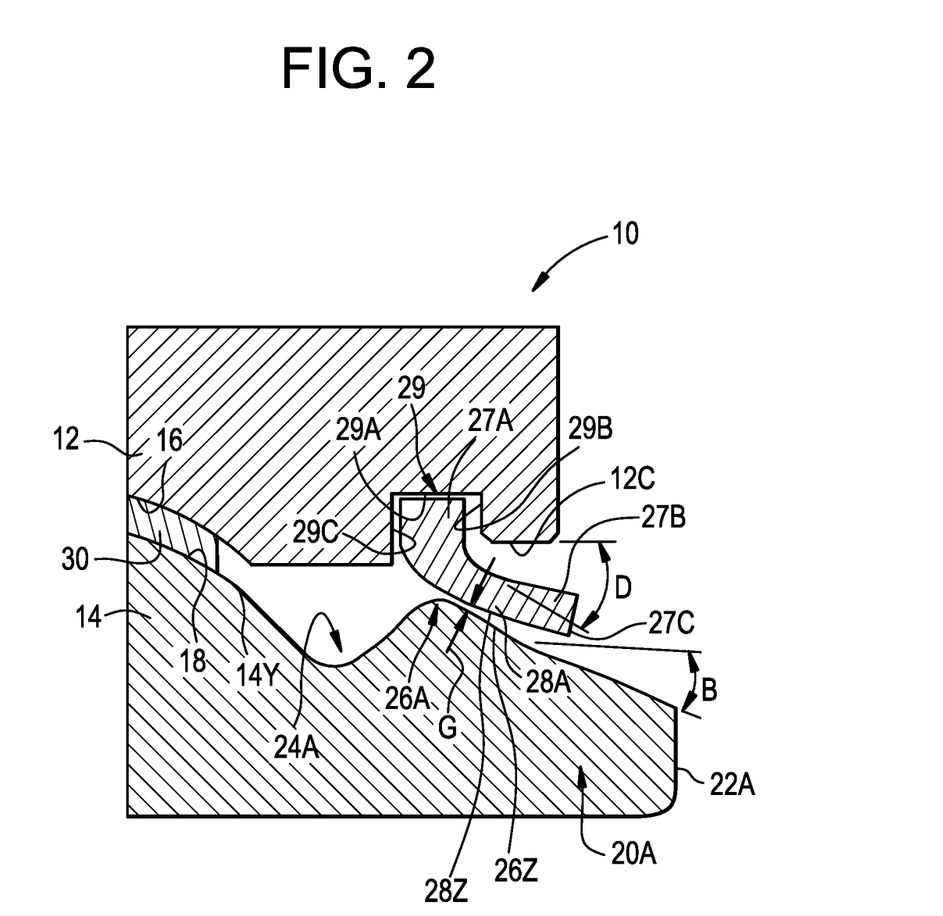
FIG. 2 is an enlarged front cross sectional view of a portion of the bearing assembly of FIG. 1.

In one embodiment, as best shown in FIG. 2, the hub 20A tapers radially inward towards the axial end 22A of the inner member 14 at an angle β. Similarly, the hub 20B tapers radially inward towards the axial end 22B of the inner member 14 at an angle β. The configuration of the hubs 20A and 20B discussed herein mitigates entry of contaminants into the bearing assembly 10 by urging the contaminants to slide away from the arcuate outer surface 18 along the taper. As best shown in FIG. 2, a circumferentially extending groove 29 is formed in the outer race 12 proximate the first axial end 12A of the outer race. The groove 29 is defined by a radially inward facing base 29A which extends between two axial facing sidewalls 29B and 29C. As shown in FIG. 1, a similar groove is formed in the outer race proximate the second end 12B of the outer race 12.

As best shown in FIG. 2, a seal 28A is secured to the outer race 12 by the groove 29, proximate the first end 12A of the outer race 12. In particular, the seal 28A defines a base portion 27A and a flexible leg 27B extending outwardly from the base portion 27A towards a free distal end 27C. The base portion 27A is seated, for example, press fit, into the groove 29 such that the base portion 27A frictionally engages the base portion 29A and the side walls 29C and 29D (see FIG. 2) of the groove 29. The leg 27B is configured in a shape complementary to a portion of the hub 20A, for example the protrusion 26A. The base portion 27A and the flexible leg 27B are flexible. Another seal 28B is secured in a predetermined position to the outer race 12 in the in a groove 29' in a similar manner (see FIG. 1). The seals 28A and 28B are held in the predetermined position by the respective base portions 27A being seated in the respective groove 29. In the predetermined position the leg 27B extends axially outward and radially inward relative to a radially inward face 12C of the outer race 12 at an angle D.

Figure 3:
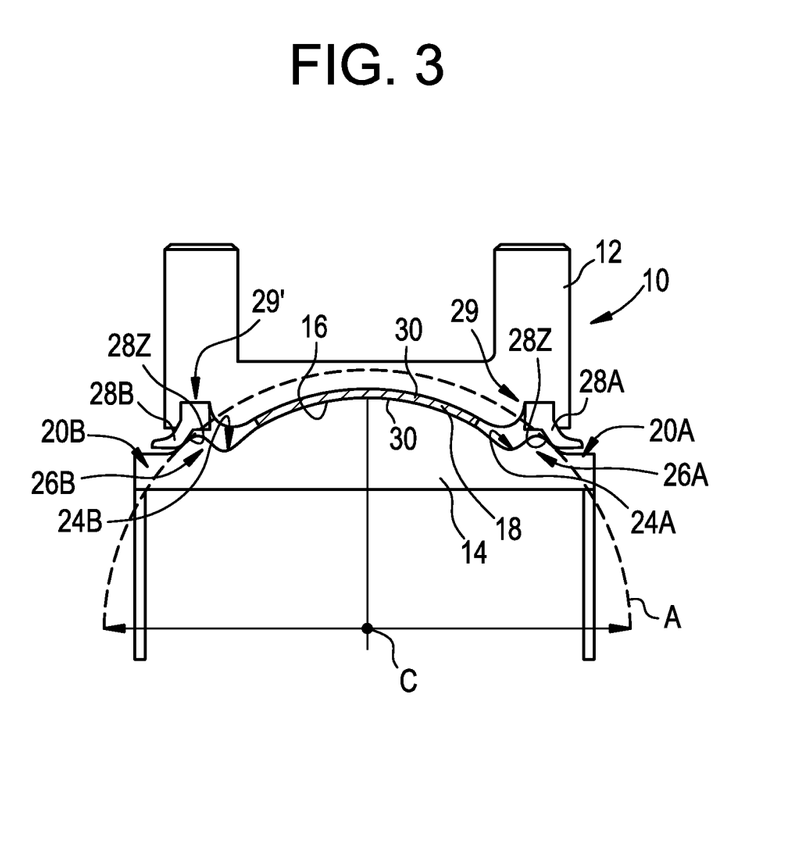
FIG. 3 is is a front cross sectional view of the bearing assembly of FIG. 1.
Figure 4:
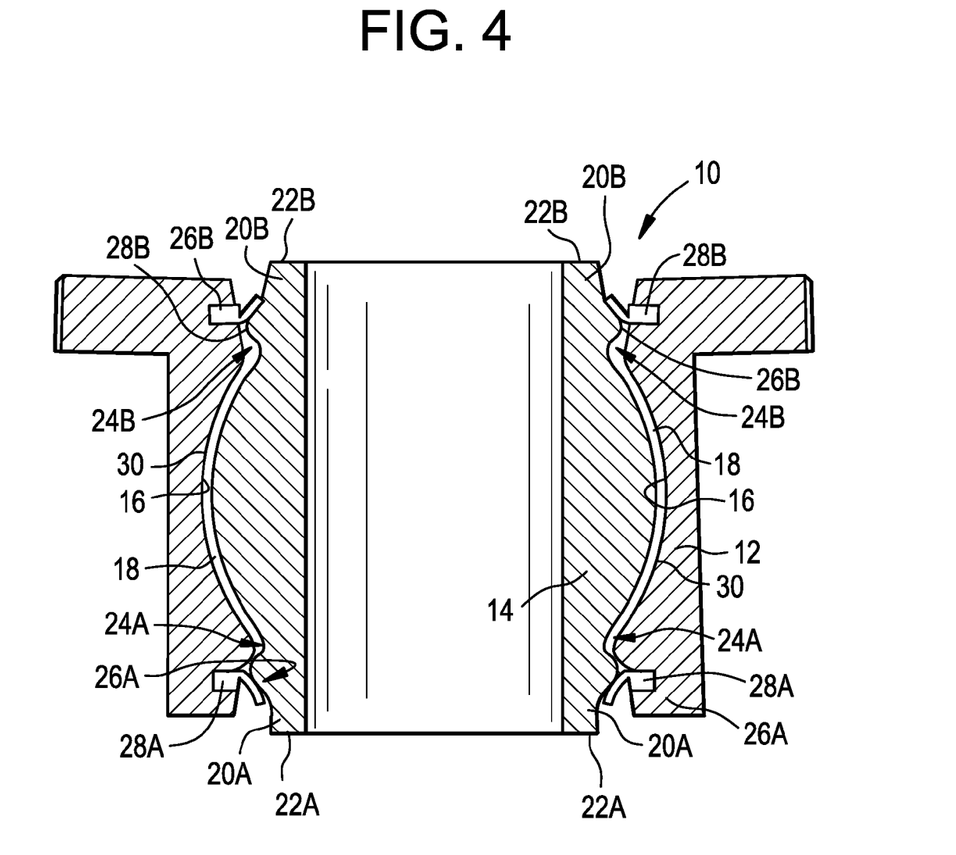
FIG. 4 is a cross sectional view of another embodiment of the bearing assembly of FIG. 1.

As shown in FIG. 3, the origin of the bearing 10 or the center point, indicated by the point C, is the center of rotation of the inner member 14. In one embodiment, there is space or gap G (see FIG. 2) between the outer surface 26Z of the protrusion 26A and an inner surface 28Z of the flexible leg 27B of the seal 28A. A similar space or gap G exists between the inner surface 28Z of the flexible leg 27B and the protrusion 26B. Both the protrusions 26A and 26B and the seals 28A and 28B (i.e., the base portion 27A and flexible leg 27B) have the same point of rotation C as the bearing 10. The space or gap G between the surface protrusion 26A, 26B and the seal 28A, 28B is maintained when the bearing is out of alignment with the outer race 12 along the arcuate path A indicated by the curved dashed arrow A. In one embodiment, the seal is radially deflectable by the circumferentially extending surface protrusion 26A, 26B in response to misalignment of the inner member relative to the outer race. This prevents the surfaces from touching the respective seal 28A, 28B. There is no contact between the flexible leg 27B of the seal 28A and the inner member 14, the outer surface 18, or the surface protrusion 26A. There is no contact between the flexible leg 27B of the seal 28B and the inner member 14, the outer surface 18, or the surface protrusion 26B.

Figure 5:
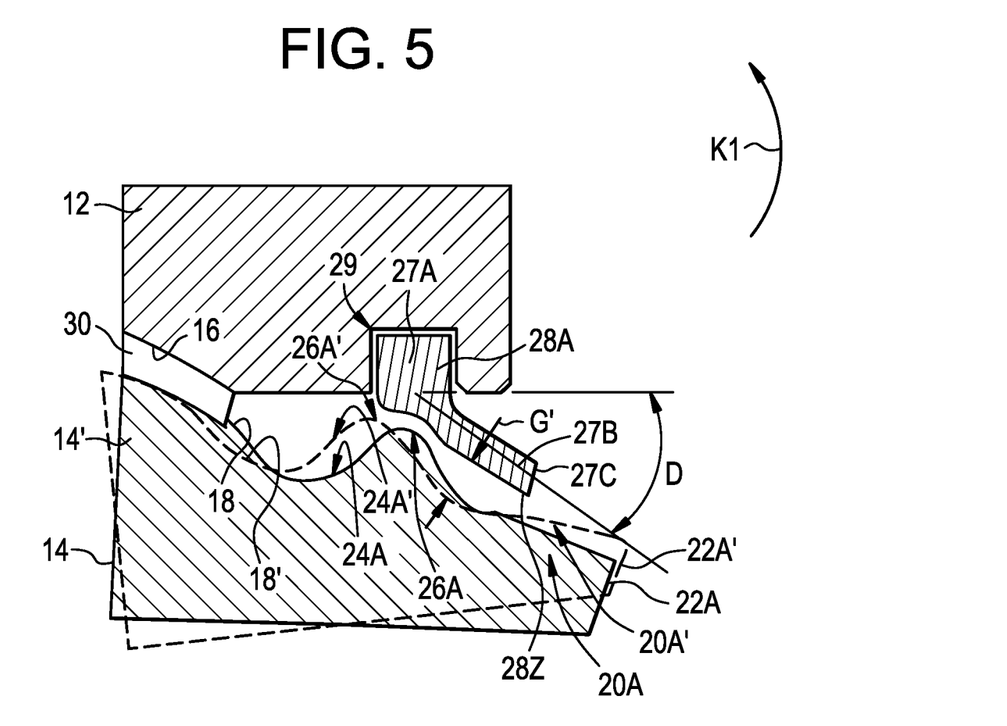
FIG. 5 is a cross sectional view of the bearing assembly of FIG. 2 wherein an inner member is misaligned in a first direction.
Figure 6:
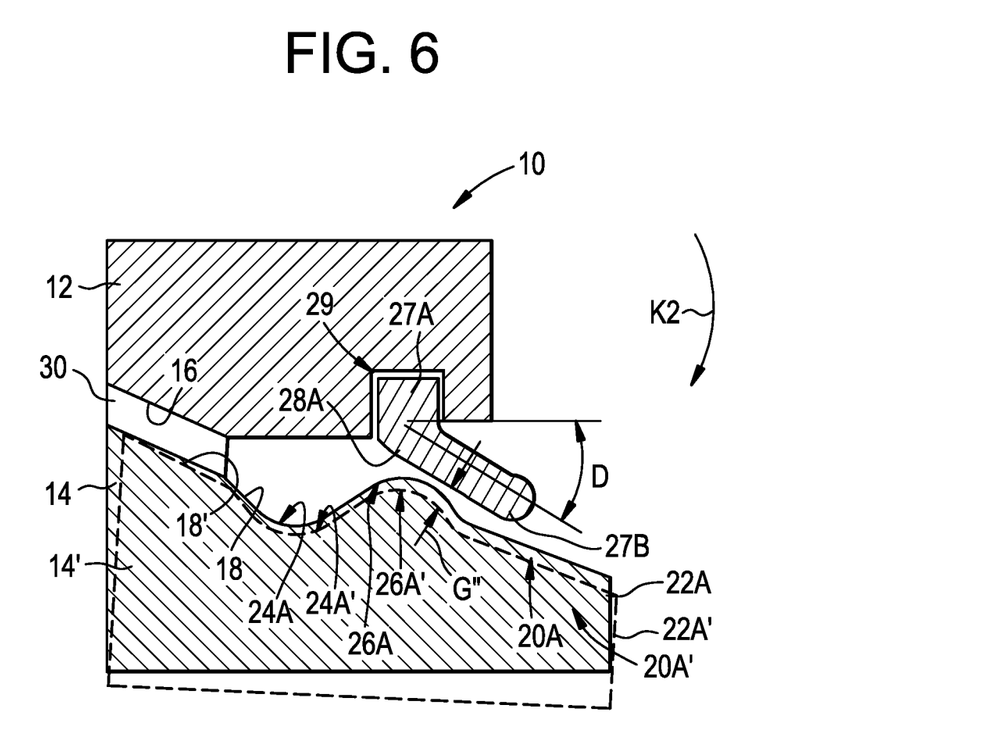
FIG. 6 is a cross sectional view of the bearing assembly of FIG. 2 wherein the inner member is misaligned in a second direction.

In one embodiment, as shown in FIGS. 5 and 6, the inner member 14 is misalignable relative to the outer race 12 along the arcuate path A (see FIG. 3) indicated by the curved dashed arrow A. The circumferentially extending surface protrusions 26A and 26B are positioned spaced apart from the respective seal 28A by the space or gap G so that the seal remains in the predetermined position. A similar space or gap G exists between the inner surface 28Z of the flexible leg 27B and the protrusion 26B. As shown in FIG. 5, when the inner member 14 is misaligned in a first direction, wherein the inner member along with the circumferentially extending surface protrusion 26A is displaced in the direction annotated by the arrow K1, the inner member 14' does not displace or deflect the flexible leg 27B of the seal 28 and the gap G' is about equal to the gap F due to the tapering of the hub 20A'. As shown in FIG. 6, when the inner member 14 is misaligned in a second direction, wherein the inner member along with the circumferentially extending surface protrusion 26A is displaced in the direction annotated by the arrow K2, the seal 28A does not contact the inner member 14' or the hub, and the gap G" is about equal to the gap G.

As shown in FIG. 3 the bearing assembly 10 has a center point C. The circular arc A is concentric about the center point C. The seals 28A and 28B are positioned along the arc A. The circumferentially extending surface protrusions 26A and 26B are positioned along the arc A. Positioning both the seals 28A and 28B and the circumferentially extending surface protrusions 26A and 26B along the arc A allows the inner member 14 to misalign without the circumferentially extending surface protrusions 26A and 26B axially displacing the seals 28A and 28B. The space or gap G between the surfaces of the circumferentially extending surface protrusion 26A, 26B and the respective surfaces of the seal 28A, 28B is maintained when the bearing is misaligned (see FIG. 2). This prevents the two surfaces from touching each other, and the seal 28A, 28B remains in the predetermined position during the misalignment of the inner member 14 relative to the outer race 12. The circumferentially extending surface protrusions 26A and 26B provide support for the seals 28A and 28B in the event that the seals receive a force imparted thereon, for example from the outer race 12. In addition, the circumferentially extending surface protrusions 26A and 26B prevent the seals from being drawn into the bearing. The circumferentially extending surface protrusions 26A and 26B provide a barrier to preclude entry of contaminants into the bearing.

Figure 5A:
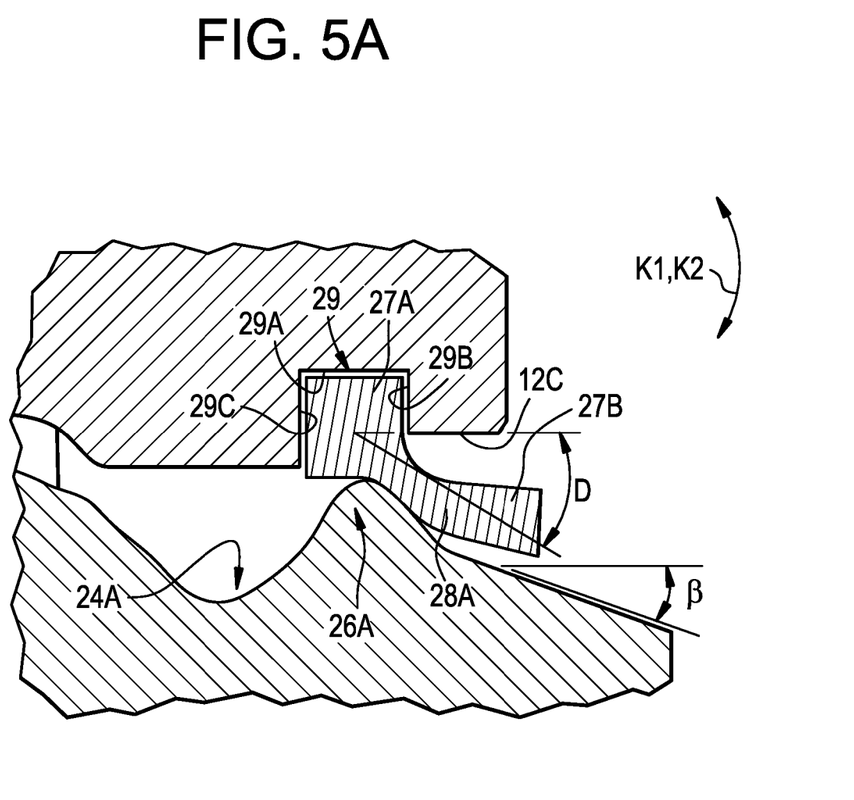
FIG. 5A is an enlarged view of an embodiment of the seal slidingly engaging a protrusion on the hub.

As shown in FIG. 5A, in one embodiment, the seal 28A, 28B slidingly engages the respective surface protrusion 26A, 26B and the seal 28A, 28B remains in the predetermined position during the misalignment of the inner member relative to the outer race 12. An area of the surface protrusion 26A, 26B, for example, the area 91, is in sliding engagement with the seal 28A, 28B.

In one embodiment, as best shown in FIG. 3, a liner 30 (e.g., a self lubricating liner) is positioned between the outer surface 18 and the inner surface 16. In some embodiments, liner 30 is applied to outer surface 18. In some embodiments, liner 30 is applied to inner surface 16. The liner reduces friction between the outer surface 18 and the inner surface 16. In one embodiment, the seal 28A, 28B is radially deflectable by the at circumferentially extending surface protrusion 26A, 26B in response to misalignment of the inner member 14 relative to the outer race 12.

Figure 7:
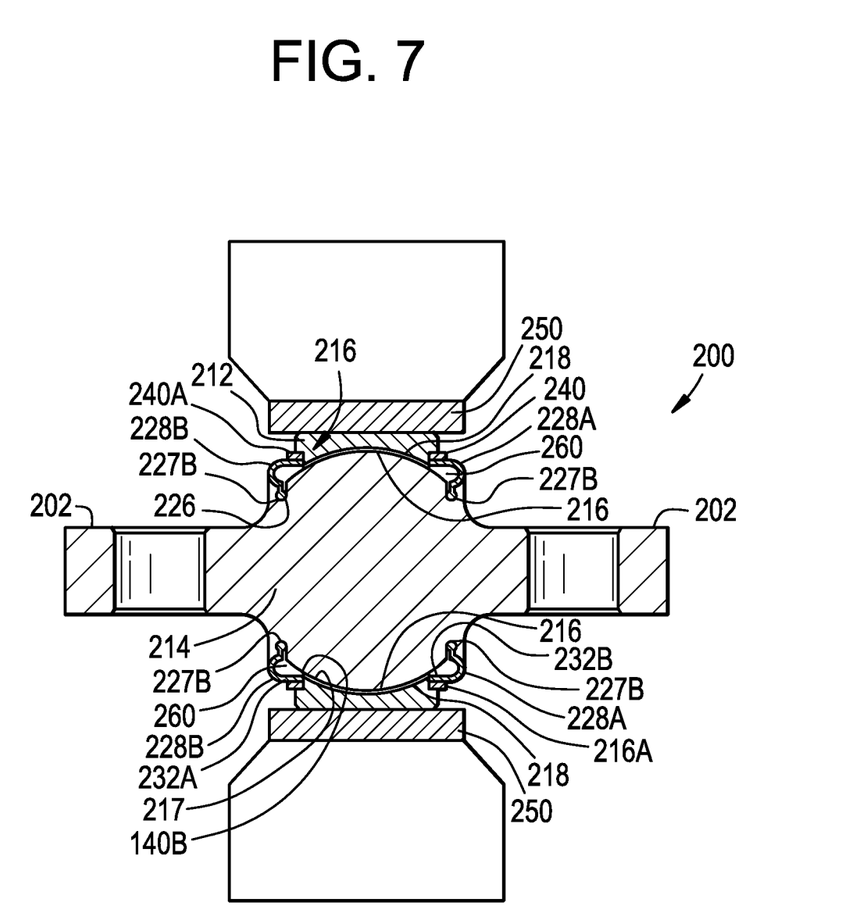
FIG. 7 is a cross sectional view of a sealed spherical bearing in accordance with one embodiment of the present invention.

In reference to FIG. 7, a bearing 200 in accordance with one embodiment of the present invention is shown. The bearing 200 includes an outer race 212 and an inner member 214 disposed therein. The bearing 200 may be received in a housing 250. The outer race 212 defines an inner surface 216. The inner surface 216 is configured or contoured to engage or receive a correspondingly configured or convex contoured outer surface 218 of the inner member 214. When the inner member 214 is disposed in the outer race 212, an area of engagement 217 is defined by the contoured inner surface 216 and the contoured outer surface 218. The inner member 214 and the outer race 212 are rotatable and/or misalignable relative to each other. A shaft 202 extends from opposing sides of the inner member 214. A cavity 260 is formed by the outer race 212, the inner member 214, and the seals 228A and 228B that extend between the inner member 214 and the outer race 212. In some embodiments, a lubricant is further disposed in the cavity 260 to further inhibit the ingress of contaminants between the outer race 212 and the inner member 214.

As shown in FIG. 7, the bearing 200 includes two seals 228A and 228B extending between the outer race 212 and the inner member 214 and positioned on opposing axial ends of the bearing 200. The seals 228A and 228B inhibit the ingress of contaminants into the bearing 200 and prevent such contaminants from impinging the sliding surface formed by the inner surface 16 and the outer surface 218. The seals 228A and 228B each have a first end 227A and a second end 227B. The seals 228A and 228B each define a radially outward facing surface 232A and a radially inward facing surface 232B proximate the first end 227A. In the embodiments shown in FIGS. 7 and 8, the seals 228A and 228B form a ring. It should be understood that the geometry of the seals 228A and 228B may vary depending on the geometry of the outer race 212, the inner member 214, and the bearing 200 generally.

Figure 8:
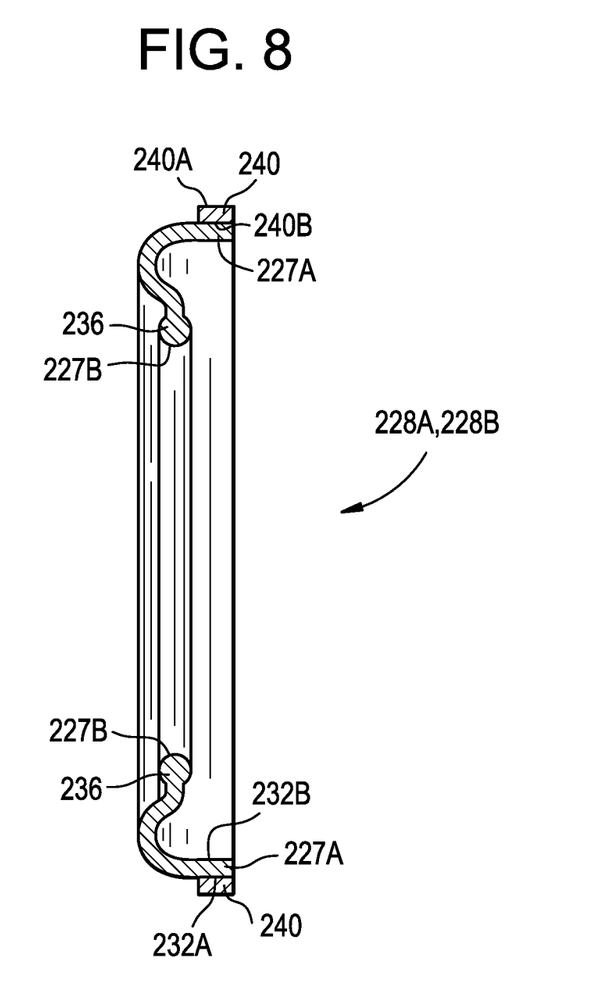
FIG. 8 is an enlarged front cross sectional view of a portion of the bearing assembly of FIG. 7.

As shown in FIGS. 7 and 8, the seals 228A and 228B are each secured to a retainer 240. The retainer 240 defines a radially outward facing surface 240A and a radially inward facing surface 240B. The retainer 240 is used to engage the first end 227A of each of the seals 228A and 228B in the outer race 212. The radially inward facing surface 240B of the retainer 240 engages the radially outward facing surface 232A of the annular seals 228A and 228B. The retainer 240 has a ring shape similar in diameter to the seals 228A and 228B as measured at the first end 227A. In one embodiment, the radially outward facing surface 240A of the retainer 240 and the radially inward facing surface 240B of the retainer 240 are substantially parallel to one another.

The first end 227A of the seals 228A and 228B is secured to the retainer 240 using a bonding agent. In some embodiments, the first end 227A of each of the seals 228A and 228B is secured to the retainer 240 with a press-fit. It should be understood that any known method for securing the first end 227A of each of the seals 228A and 228B to the retainer 240 may be used. It should be further understood that any surface or facing surface of a portion of an embodiment of a seal that is described herein below as secured to any surface or facing surface of a portion of an embodiment of a retainer incorporates the manner of bonding described herein with reference to the seals 228A and 228B being secured to the retainer 240.

In reference to FIG. 7, the seals 228A and 228B are located between the outer race 212 and the inner member 214. The retainer 240 is press fit into a first annular groove 216 defined by the outer race 212 (e.g., completely formed in the outer race 212). The annular groove 216 is open in an axially outward direction from the axially outward facing surface 216B such that the radially inward facing surface 216A extends continuously axially outward to an end of the outer race 212. Thus, the axially outward facing surface 216B defines an axial outward end or termination of the area of engagement 217 positioned therein.

In one embodiment, the radially outward facing surface 240A of the retainer 240 engages the radially inward facing surface 216A of the annular groove 216. In one embodiment, the annular groove 216 has an L-shaped cross section. After the retainer 240 is press fit into the first annular groove 216, the retainer 240 and seals 228A and 228B that are secured thereto are fixed relative to the outer race 212. The first annular groove 216 is sized to receive the retainer 240 therein. In one embodiment, the retainer abuts the axially outward facing surface 216B and extends axially outward beyond the end of the outer race 212 and the radially inward facing surface 216A. In further reference to FIG. 7, the retainer 240 is press fit into the first annular groove 216 defined by the outer race 212. This provides an advantage over fixing the first end 227A of the seals 228A and 228B to an external housing 250. This method eliminates the need to install the seals 228A and 228B into the housing 250 after the bearing 200 is installed in the housing 250.

Although the present invention has been disclosed and described with reference to certain embodiments thereof, it should be noted that other variations and modifications may be made, and it is intended that the following claims cover the variations and modifications within the true scope of the invention.

What is claimed is:

1. A bearing assembly comprising:
an outer race having an annular arcuate inner surface extending between opposing annular radially inward facing surfaces formed in the outer race; and
an inner member being at least partially disposed in the outer member, the inner member having:
a ball portion having an arcuate outer surface; and
at least one hub extending axially from a respective axial side of the ball portion of the inner member, each hub having:
a circumferentially extending surface depression positioned proximate the arcuate outer surface;
a circumferentially extending surface protrusion positioned axially outward from and defining the circumferentially extending surface depression, the surface protrusion having a sloped exterior surface axially opposite the surface depression and extending toward an axial end of the hub; and
a seal having a base portion secured to the outer race within an annular groove in a respective one of the radially inward facing surfaces, a portion of which is substantially radially opposite the surface protrusion the seal having a flexible leg having a free distal end and extending axially outward and radially inward from the base portion, in a predetermined position defined by an angle relative to the respective radially inward facing surface, such that the flexible leg of the seal extends axially outward beyond the sloped exterior surface of the circumferentially extending surface protrusion, the seal being in sliding engagement with the sloped exterior surface of the circumferentially extending surface protrusion; and wherein the flexible leg of the seal maintains the free distal end in the predetermined position during misalignment of the inner member relative to the outer race.

2. The bearing assembly of claim 1, wherein each hub comprises a conical section that tapers radially inward toward the axial end of the hub and the flexible leg of the seal extends over the conical section.

3. The bearing assembly of claim 1, wherein the seal is held in place by a force exerted by the outer race.

4. The bearing assembly of claim 1, wherein a liner is positioned between the outer surface of the ball portion and the inner surface of the outer race.

5. The bearing assembly of claim 1, wherein the each circumferentially extending surface depression is on a respective one of the hubs.

6. The bearing assembly of claim 1, wherein the each circumferentially extending surface protrusion is on a respective one of the hubs.

7. A bearing assembly comprising:
an outer race having an annular arcuate inner surface extending between opposing annular radially inward facing surfaces formed in the outer race; and
an inner member being at least partially disposed in the outer member, the inner member having:
a ball portion having an arcuate outer surface; and
at least one hub extending axially from a respective axial side of the ball portion of the inner member, each hub having:
a circumferentially extending surface depression positioned proximate the arcuate outer surface;
a circumferentially extending surface protrusion positioned axially outward from and defining the circumferentially extending surface depression, the surface protrusion having a sloped exterior surface axially opposite the surface depression and extending toward an axial end of the hub; and
a seal having a base portion secured to the outer race within an annular groove in a respective one of the radially inward facing surfaces, a portion of which is substantially radially opposite the surface protrusion, the seal having a flexible leg having a free distal end and extending axially outward and radially inward from the base portion, in a predetermined position defined by an angle relative to the respective radially inward facing surface, such that the seal extends axially outward beyond the circumferentially extending surface protrusion, the entire flexible leg of the seal being spaced apart from the sloped exterior surface of the circumferentially extending surface protrusion by a gap; and wherein the flexible leg of the seal maintains the free distal end in the predetermined position and the gap during misalignment of the inner member relative to the outer race.

8. The bearing assembly of claim 7, wherein each hub comprises a conical section that tapers radially inward toward the axial end of the hub and the flexible leg of the seal extends over the conical section.

9. The bearing assembly of claim 7, wherein the seal is held in place by a force exerted by the outer race.

10. The bearing assembly of claim 7, wherein a liner is positioned between the outer surface of the ball portion and the inner surface of the outer race.

11. The bearing assembly of claim 7, wherein the each circumferentially extending surface depression is on a respective one of the hubs.

12. The bearing assembly of claim 7, wherein the each circumferentially extending surface protrusion is on a respective one of the hubs.

* * * * *